(12) United States Patent
Sekiguchi

(10) Patent No.: US 7,907,287 B2
(45) Date of Patent: Mar. 15, 2011

(54) POSITIONING APPARATUS, EXPOSURE APPARATUS AND DEVICE MANUFACTURING METHOD IN WHICH A CORRECTION UNIT CORRECTS A VALUE MEASURED BY A SELECTED MEASURING DEVICE

(75) Inventor: Hiroyuki Sekiguchi, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 281 days.

(21) Appl. No.: 11/870,798

(22) Filed: Oct. 11, 2007

(65) Prior Publication Data

US 2008/0098813 A1 May 1, 2008

(30) Foreign Application Priority Data

Oct. 25, 2006 (JP) .................................. 2006-290262

(51) Int. Cl.
*G01B 9/02* (2006.01)
(52) U.S. Cl. ....................................................... 356/500
(58) Field of Classification Search .......... 356/486–488, 356/493–495, 498, 500
See application file for complete search history.

(56) References Cited

U.S. PATENT DOCUMENTS

| 5,838,443 | A | 11/1998 | Sekiguchi | 356/363 |
|---|---|---|---|---|
| 6,025,688 | A | 2/2000 | Sekiguchi | 318/610 |
| 6,285,437 | B1 * | 9/2001 | Tokunaga | 355/53 |
| 6,495,847 | B1 | 12/2002 | Asano et al. | |
| 6,891,597 | B2 | 5/2005 | Sekiguchi | 355/53 |
| 7,215,095 | B2 | 5/2007 | Sekiguchi | 318/575 |
| 2003/0165265 | A1 | 9/2003 | Kurosawa | |
| 2007/0194741 | A1 | 8/2007 | Sekiguchi | 318/649 |

FOREIGN PATENT DOCUMENTS

| JP | 10-289943 | 10/1998 |
|---|---|---|
| JP | 2000-187338 | 7/2000 |
| JP | 2003-254739 | 9/2003 |

* cited by examiner

*Primary Examiner* — Hwa S. A Lee
(74) *Attorney, Agent, or Firm* — Fitzpatrick, Cella, Harper & Scinto

(57) ABSTRACT

A positioning apparatus, which positions a stage, includes a measurement system that measures a position of the stage. The measurement system includes a plurality of measuring devices that are spaced apart from each other along a first direction and measure a position of the stage in a second direction. A switching unit switches between the measuring devices to measure the position of the stage when the stage moves in at least the first direction. A correction unit corrects, based on an acceleration of the stage, the value measured by the measurement system. When the switching unit switches between the plurality of measuring devices, the correction unit corrects, based on a value obtained by the correction, a value measured by a measuring device after the switching.

10 Claims, 18 Drawing Sheets

F I G. 16
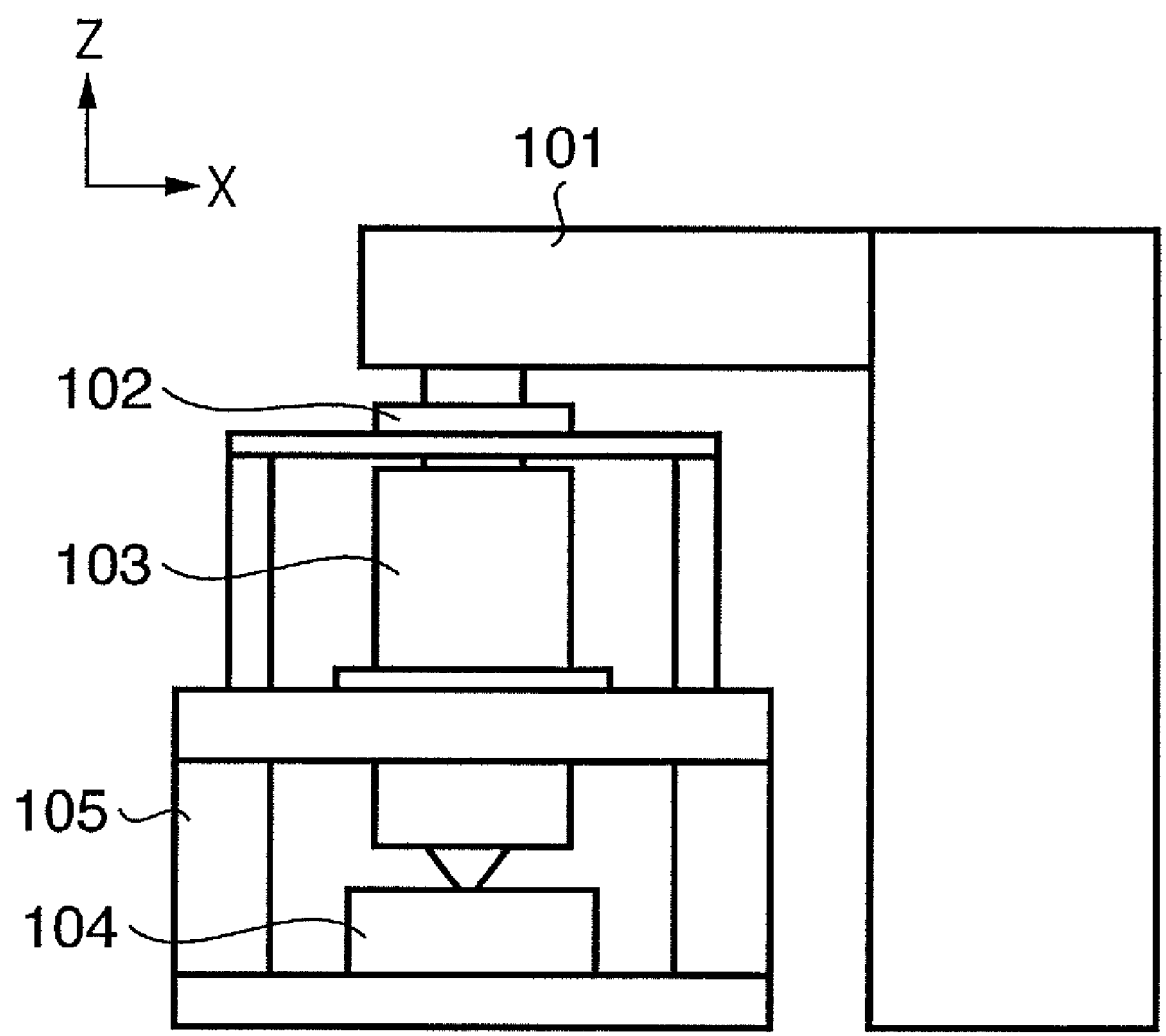

POSITIONING APPARATUS, EXPOSURE APPARATUS AND DEVICE MANUFACTURING METHOD IN WHICH A CORRECTION UNIT CORRECTS A VALUE MEASURED BY A SELECTED MEASURING DEVICE

This application claims the benefit of Japanese Application No. 2006-290262, filed Oct. 25, 2006, which is hereby incorporated by reference herein in its entirety.

BACKGROUND OF THE INVENTION

1. Field of the Invention

The present invention relates to a positioning apparatus.

2. Description of the Related Art

Along with the recent advance of the information-oriented society, the degrees of integration of, for example, devices and circuits are rapidly increasing. The development of micropatterning technologies has attained such an increase in the degrees of integration. For example, Japanese Patent Laid-Open No. 10-289943 discloses a system which controls a stage using a laser interferometer. This system incorporates an interferometer for measuring the position of the stage, so that one driving axis of the stage corresponds to one measurement light beam axis.

However, to move the stage with a long stroke in this system, it is necessary to attach an interferometer with a large mirror to the stage. This results in a decrease in the dynamic characteristic of a control system of the stage. Assume, for example, that an interferometer for focus direction measurement is set in the exposure apparatus. From the viewpoint of the arrangement relationship with a projection lens, it is geometrically difficult to lay out the light beam axis of one interferometer, such that it allows measurement in the whole movable region of the stage.

To solve this problem, Japanese Patent Laid-Open No. 2000-187338 proposes a technique of using a plurality of interferometers to cover one driving axis of the stage, and to switch them between the off-axis alignment measurement time and the exposure time, thereby reducing the weight of their mirrors. To measure the position of the stage by switching between, for example, two interferometers, a stroke with which both interferometers can simultaneously measure the stage position is determined. Then, the measurement value of one interferometer for measuring the position of the stage in this stroke is preset, as the measurement value of the other interferometer to be selected next.

When a plurality of interferometers are switched during stage driving, a predetermined amount of position error proportional to the moving velocity occurs, during the time interval from reading the measurement value of one measurement interferometer to presetting it as the measurement value of the other interferometer. A variation in this time increases the error to an indefinite value, so the error value at the current position is accumulated. To avoid this problem, Japanese Patent Laid-Open No. 2003-254739 calculates the product of the moving velocity of the stage and the switching execution time, and sets a value obtained by adding the product to the position of the stage, before switching, as the initial value after switching. This makes it possible to reduce errors upon switching at a constant velocity.

Unfortunately, the prior art causes errors due to the switching between, for example, measuring devices, such as interferometers, during stage acceleration/deceleration, because the stage deforms.

In a stage of, for example, a semiconductor exposure apparatus, even a switching error of several nm often becomes problematic. However, it is unavoidable that a stage top plate and a measurement reference mirror, arranged on it, deform during stage acceleration/deceleration. When laser interferometers are switched while the mirror has deformed, the shape of the mirror irradiated with a laser beam changes between the acceleration time, the constant velocity time, and the stop time, resulting in switching errors. Repeating switching during acceleration/deceleration accumulates switching errors.

SUMMARY OF THE INVENTION

The present invention has been made in consideration of the above problems, and has as its object to suppress measurement errors due to the acceleration/deceleration of a stage in a positioning apparatus.

According to the present invention, a positioning apparatus positions a stage. The positioning apparatus includes a measurement system, which measures the position of the stage, and a correction unit, which corrects, based on the acceleration of the stage, the value measured by the measurement system.

According to the present invention, it is possible to suppress measurement errors due to the acceleration/deceleration of a stage in a positioning apparatus.

Further features of the present invention will become apparent from the following description of exemplary embodiments, with reference to the attached drawings.

BRIEF DESCRIPTION OF THE DRAWINGS

FIG. 16 is a view for explaining an exposure apparatus;

DESCRIPTION OF THE EMBODIMENTS

Preferred embodiments of the present invention will be described below, with reference to the accompanying drawings.

First Embodiment

Figure 1:
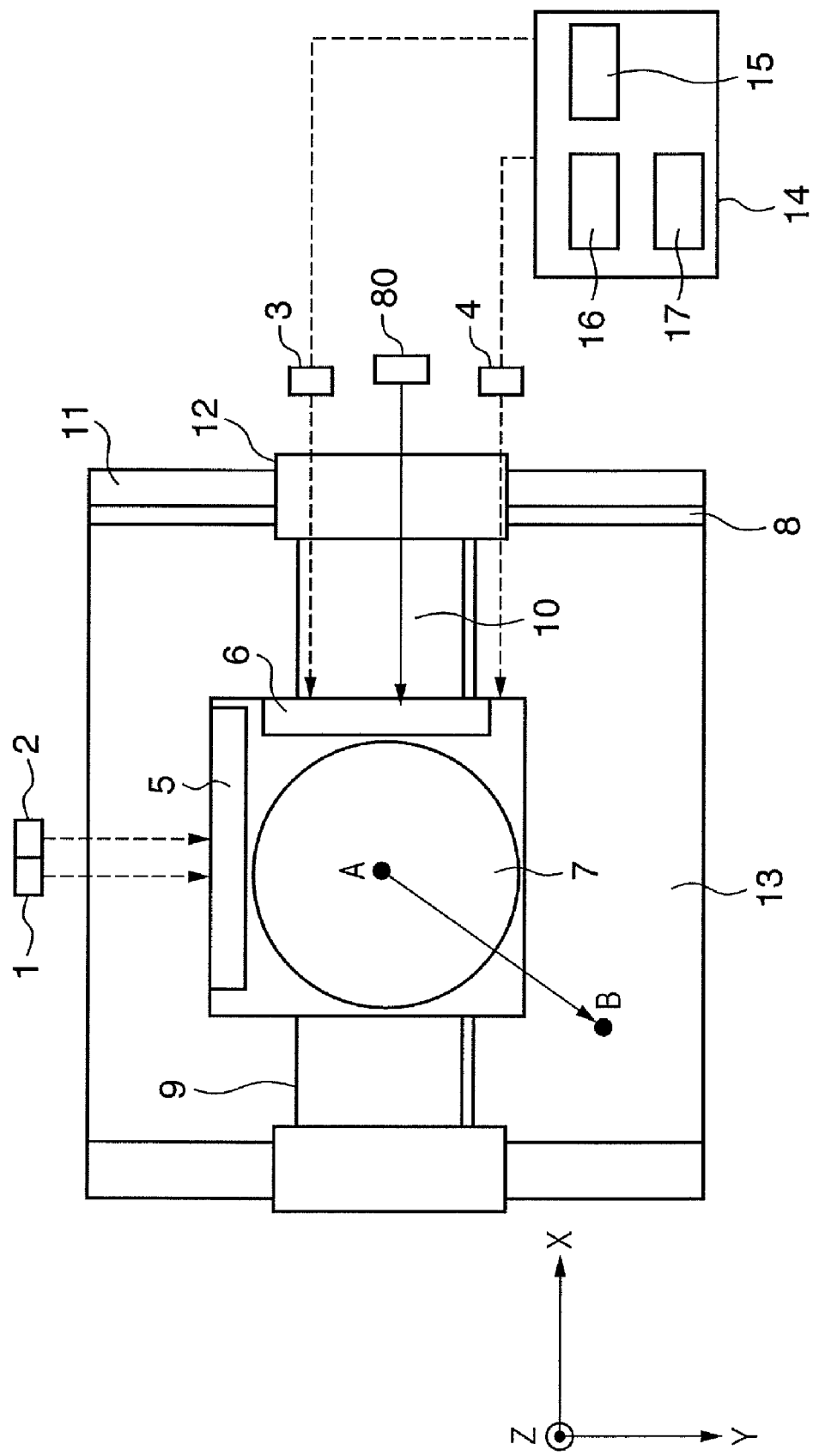
FIG. 1 is a view showing a positioning apparatus according to the first embodiment.

FIG. 1 is a view showing a positioning apparatus according to the first preferred embodiment, and, particularly, exemplifies a case wherein this apparatus is applied to a wafer stage 7 of a semiconductor exposure apparatus. The wafer stage 7 can move in the X and Y directions orthogonal to each other on its surface, and in the Z direction perpendicular to both the X and Y directions. The wafer stage 7 supports a Y mirror 5, an X mirror 6, and a wafer chuck (not shown). Although FIG. 1 shows a wafer stage 7 which can be driven in the X-, Y-, and Z-axis directions for descriptive convenience, it may be driven in six-axis directions. The mirror 6 is used to measure the coordinate position of the wafer stage 7 in the X-axis direction by reflecting a measurement light beam from an X-axis interferometer 3 or 4. The X-axis interferometers 3 and 4 are measuring devices, which are spaced apart from each other along the Y direction and measure the position of the wafer stage 7 in the X direction. The Y mirror 5 is used to measure the coordinate position of the wafer stage 7 in the Y-axis direction by reflecting measurement light beams from a Y-axis interferometer 1 and Yawing interferometer 2. A linear motor XLM 10 drives the wafer stage 7 in the X direction and is guided by an X-axis Yaw guide 9. A linear motor YLM (stator) 11 drives a linear motor YLM (movable element) 12 in the Y direction and is guided by a Y-axis Yaw guide 8. A flat guide 13 guides the wafer stage 7 so that the X-axis interferometers 3 and 4, which measure the X-coordinate position of the wafer stage 7, are switched in accordance with its Y-coordinate value. A switching unit 16 of a control apparatus 14 switches between the X-axis interferometers 3 and 4. If the wafer stage 7 is located close to the Y-axis interferometer 1, shown in FIG. 1, the X mirror 6 has not reached the light beam axis of the X-axis interferometer 4, so that the X-axis interferometer 3 measures the position of the wafer stage 7 in the X direction. If the wafer stage 7 is located away from the Y-axis interferometer 1, shown in FIG. 1, the X-axis interferometer 4 measures its position in the X direction for the same reason. In the first embodiment, the Y direction is the first direction in which the wafer stage 7 moves, and the X direction is the second direction in which the X-axis interferometers 3 and 4 measure the position of the wafer stage 7. The X-axis interferometers 3 and 4 form a measurement system for measuring the position of the wafer stage in the X direction, that is, the second direction.

The first embodiment provides a means that switches between two X-axis interferometers for a high degree of freedom in the X direction, and determines the measurement value at the current position for stable, accurate measurement.

Figure 2:
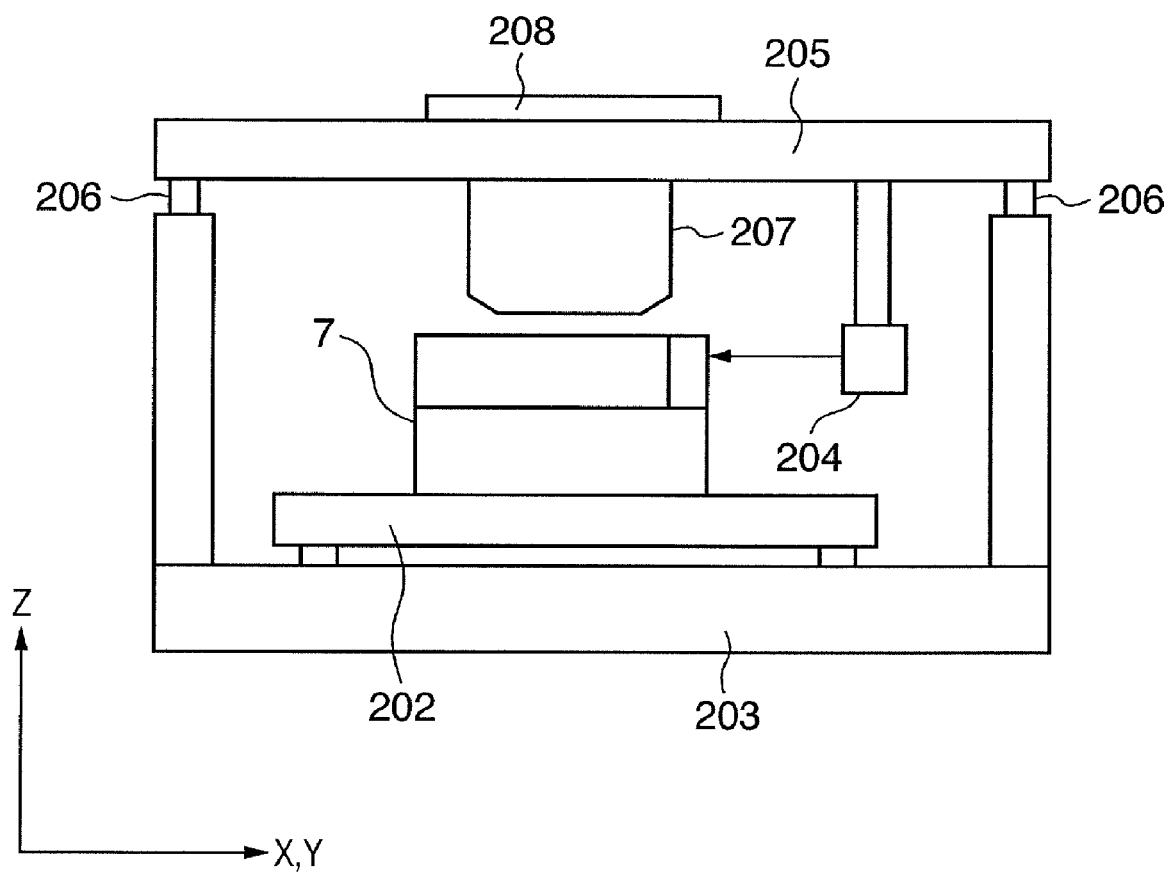
FIG. 2 is a side view of the positioning apparatus shown in FIG. 1.

FIG. 2 is a side view of the positioning apparatus shown in FIG. 1. An interferometer 204, fixed on a lens barrel supporting member 205, measures the position of the wafer stage 7. FIG. 2 shows the interferometer 204, which is viewed from the side and corresponds to one of the Y-axis interferometer 1, Yawing interferometer 2, X-axis interferometer 3, and X-axis interferometer 4 explained with reference to FIG. 1. A damper 206 holds the lens barrel supporting member 205 levitated from an anti-vibration table (pedestal) 203, to prevent any high-frequency vibration from the floor from reaching the interferometer 204 and a projection optical system of an exposure apparatus (not shown). A plurality of interferometers 204 are arranged on the lens barrel supporting member 205 in correspondence with the measurement light beam axis direction and Y position. As with the lens barrel supporting member 205, a stage surface plate 202 also prevents any high-frequency vibration from the floor from being transmitted to the wafer stage 7. A projection lens 207 is mounted on the lens barrel supporting member 205 and projects the pattern image of a reticle 208 mounted on the lens barrel supporting member 205 onto a wafer (not shown) loaded on the wafer stage 7.

Figure 3:
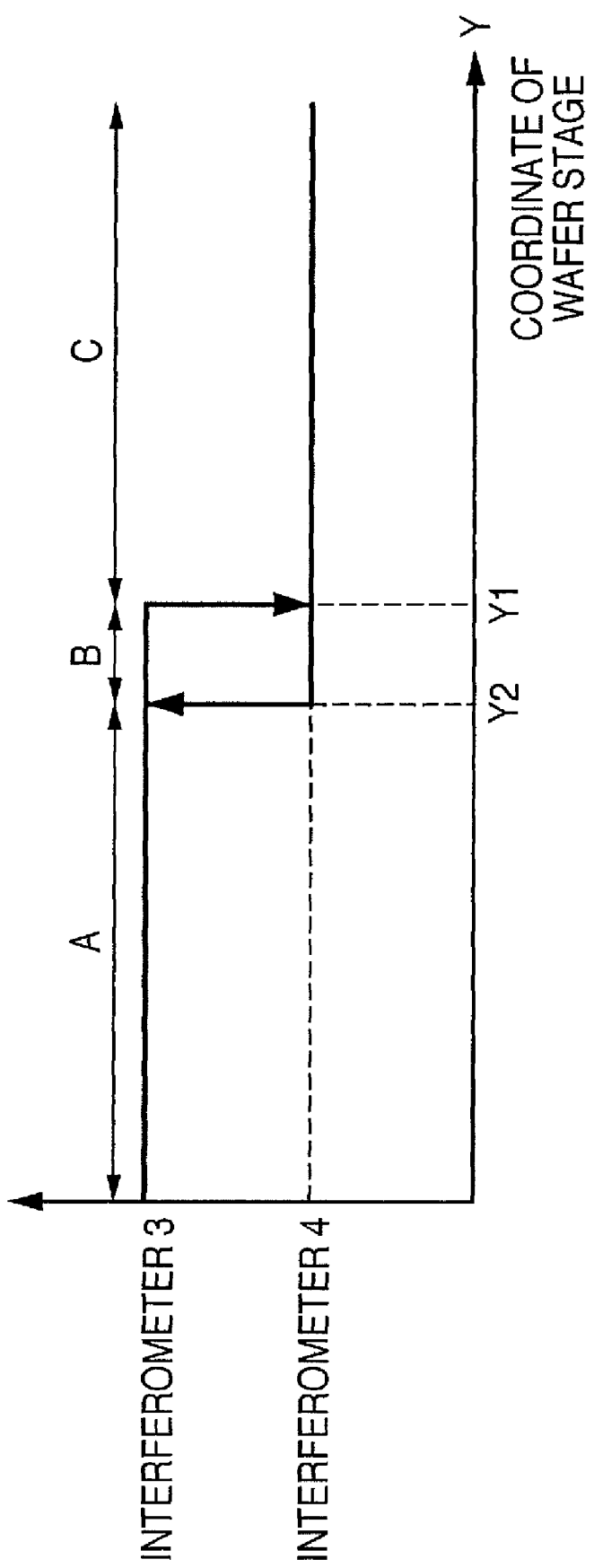
FIG. 3 is a chart showing the relationship between the Y-coordinate and an interferometer having an effective measurement value in the positioning apparatus, according to the first embodiment.

FIG. 3 is a chart showing the relationship between the Y-coordinate of the wafer stage and the measurement light beam axis of an interferometer having an effective measurement value in the positioning apparatus according to the first embodiment. If the wafer stage 7 is located close to the Y-axis interferometer 1 shown in FIG. 1, the measurement light beam axis of the X-axis interferometer 4 does not match the X mirror 6. Hence, only the X-axis interferometer 3 measures the current position of the wafer stage 7 (an interval A).

When the wafer stage 7 moves to the vicinity of the center of a driving stroke, measurement light beams from both the X-axis interferometers 3 and 4 strike the X mirror 6. Hence, both the X-axis interferometers 3 and 4 can measure the stage position (an interval B). In this manner, when the wafer stage 7 moves from the interval A to the interval B, current position information measured by the X-axis interferometer 4 is an accumulated value from an unspecified state. This information is meaningless as a measurement value indicating the current position of the wafer stage 7. In view of this, when the wafer stage 7 moves from the interval A to the interval B, the X-axis interferometer 4 determines a measurement value from the X-axis interferometer 3. For example, current position information held in the X-axis interferometer 3 is forcibly preset in the X-axis interferometer 4. Immediately after presetting, the X-axis interferometer 4 takes over, and measures the relative amount of movement of the wafer stage 7. With this operation, correct measurement values are obtained over the whole Y stroke surface of the wafer stage 7 using the X-axis interferometers 3 and 4. A position at which the X-axis interferometer 4 determines a current position measurement value from the X-axis interferometer 3 should be selected from at least one of coordinate positions during the time when position measurement light beams from both the X-axis interferometer, which transfers a measurement value, and the X-axis interferometer, which succeeds it, simultaneously strike the X mirror 6. The same applies to a case wherein the X-axis interferometer 3 determines a measurement value from the X-axis interferometer 4.

If the wafer stage 7 is located away from the Y-axis interferometer 1 shown in FIG. 1, the measurement light beam axis of the X-axis interferometer 3 does not match the X mirror 6. Hence, only the X-axis interferometer 4 measures the current position of the wafer stage 7 (an interval C). Similarly, when the wafer stage 7 moves from the interval C to the interval B, the X-axis interferometer 3 determines a measurement value from the X-axis interferometer 4.

Reference symbols Y1 and Y2 denote switching positions, that is, a position (Y1) where the X-axis interferometer 4 determines a measurement value from the X-axis interferometer 3, and a position (Y2) where the X-axis interferometer 3 determines a measurement value from the X-axis interferometer 4. The positions Y1 and Y2 are preferably different from each other. This makes it possible to prevent chattering (interferometers which hold measurement values are unnecessarily switched many times), which is likely to occur upon designating the target position of the wafer stage 7 at a position near the switching position. When the scanning exposure apparatus uses the positioning apparatus according to the first embodiment, the switching positions Y1 and Y2 may be changed in accordance with the step size in the X direction, so that the target position does not match the interferometer switching position during scanning exposure in the Y-axis direction.

Figure 4:
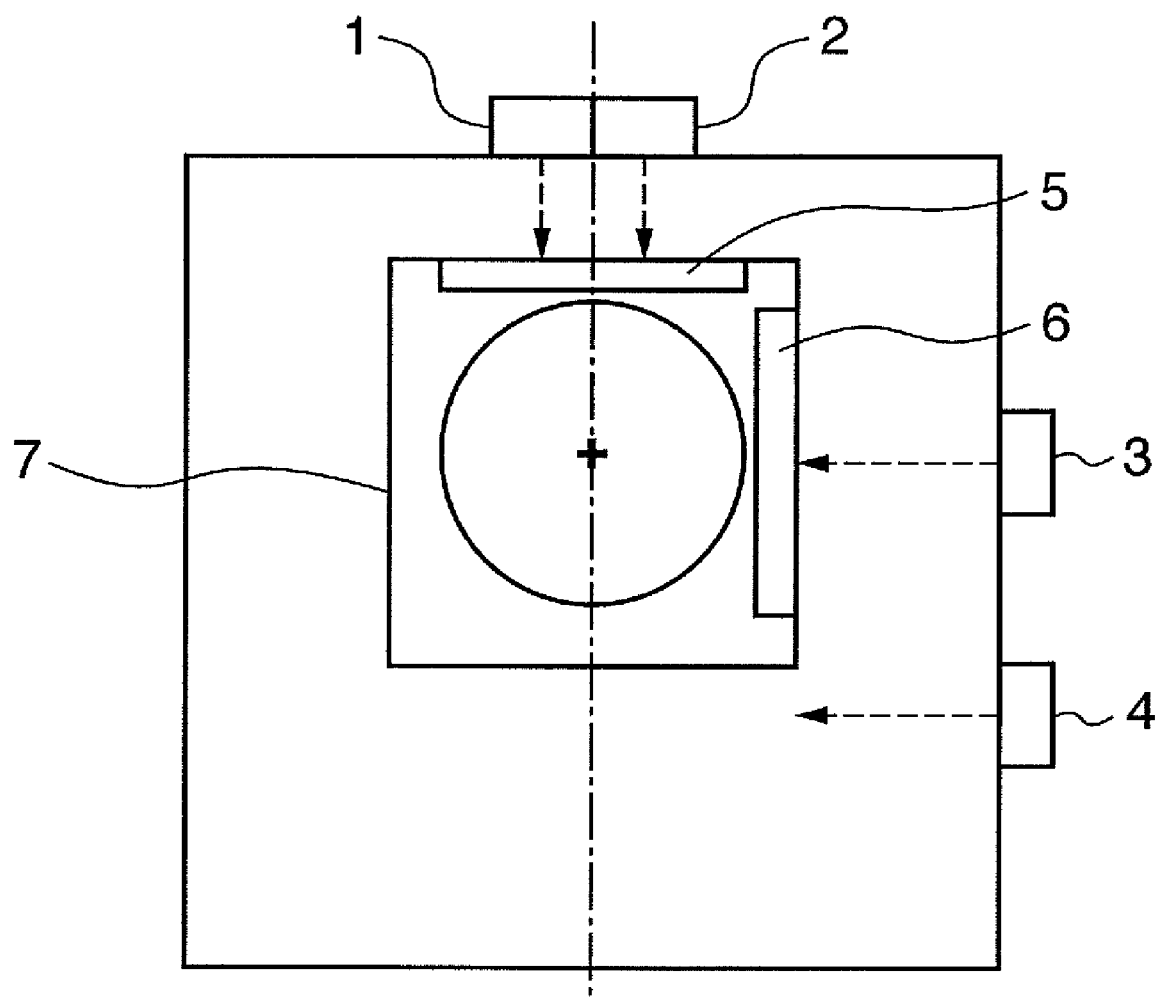
FIG. 4 is a view showing the switching between X-axis interferometers, when the stage moves forward along the Y direction, in a state wherein a wafer stage is present at the back.
Figure 5:
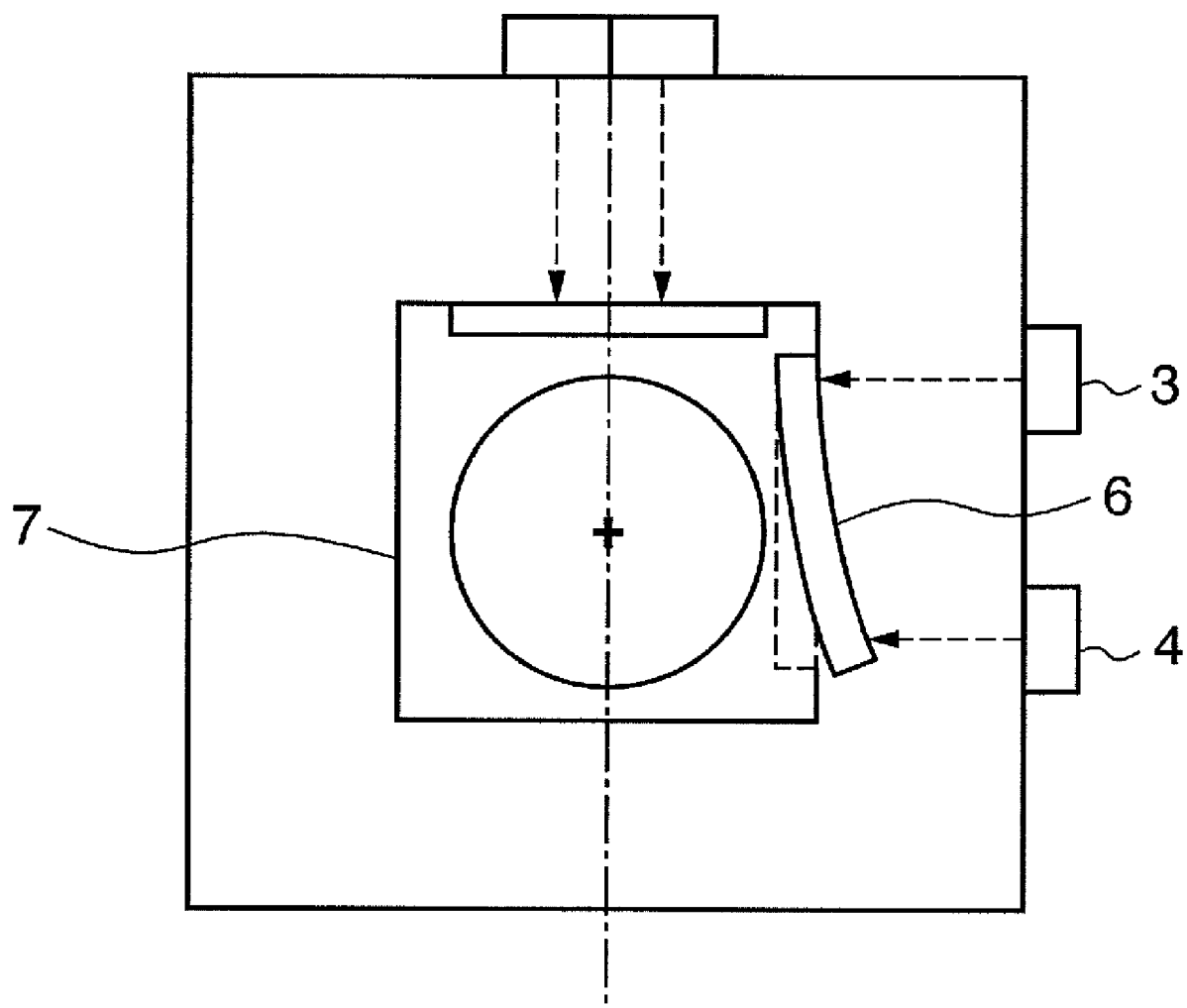
FIG. 5 is a view showing the switching between the X-axis interferometers, when the stage moves forward along the Y direction, in a state wherein the X-axis interferometers are switched, while the wafer stage is present at the center and a mirror has deformed.
Figure 6:
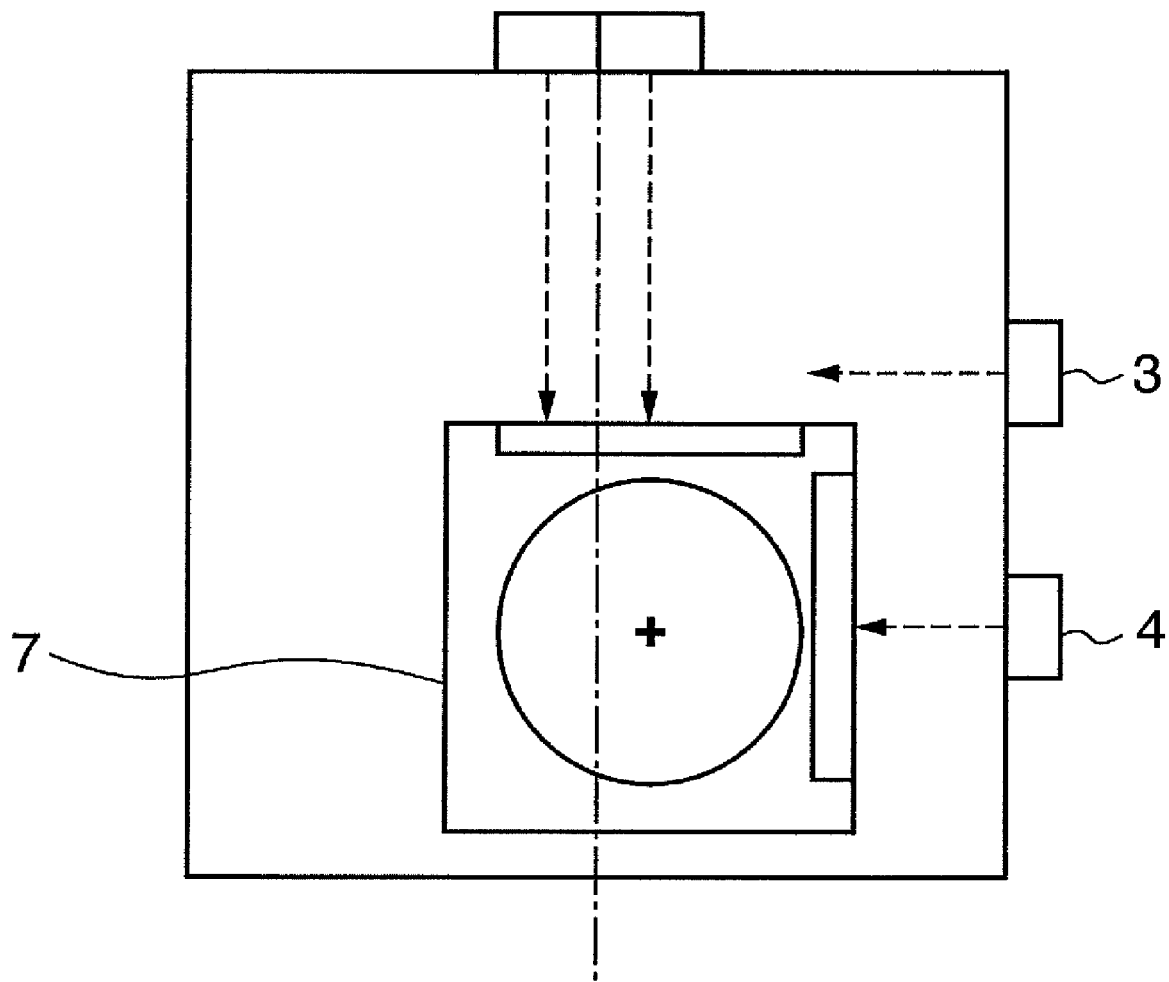
FIG. 6 is a view showing the switching between the X-axis interferometers, when the stage moves forward along the Y direction, in a state wherein the wafer stage is present in front, and an error occurs in the X direction after the switching between the X-axis interferometers.

A problem to be solved will be explained with reference to FIGS. 4 to 6. FIGS. 4 to 6 are views sequentially showing the switching between the X-axis interferometers when the wafer stage 7 moves forward along the Y direction. Referring to FIG. 4, the measurement light beam axis of only the X-axis interferometer 3 matches the X mirror 6. In this state, the X-axis interferometer 3 measures the position of the wafer stage 7 in the X direction. That is, FIG. 4 shows the state of the area A shown in FIG. 3. When the wafer stage 7 moves forward in the Y direction from the state shown in FIG. 4, it enters the state shown in FIG. 5. Referring to FIG. 5, the measurement light beam axes of both the X-axis interferometers 3 and 4 match the X mirror. That is, FIG. 5 shows the state of the area B shown in FIG. 3. At this time, the switching from the X-axis interferometer 3 to the X-axis interferometer 4 is performed. FIG. 6 shows a state wherein the wafer stage 7 further moves forward in the Y direction from the state shown in FIG. 4. Referring to FIG. 6, the measurement light beam axis of only the X-axis interferometer 4 matches the X mirror. That is, FIG. 6 shows the state of the area C shown in FIG. 3.

When the wafer stage 7 moves forward along the Y direction from the state shown in FIG. 4 to that shown in FIG. 6, the prior art transfers the value of the X-axis interferometer 3 to the X-axis interferometer 4 as its initial value in the state shown in FIG. 5. If, however, the wafer stage 7 is in the state shown in FIG. 5 during its acceleration or deceleration, it elastically deforms upon receiving a force from a linear motor. A stage top plate and mirror also elastically deform. FIG. 5 shows a deformed X mirror 6. Although FIG. 5 illustrates a largely deformed X mirror 6 for easy understanding of the problem, the actual amount of deformation is several nm. Assume that the switching from the X-axis interferometer 3 to the X-axis interferometer 4 is performed while the X mirror 6 has deformed. In this case, as the X mirror 6 recovers from the deformed state, the X position of the wafer stage 7 shifts by the amount of deformation, as shown in FIG. 6. This results in a positional error of the wafer stage 7. In a stage of, for example, a semiconductor exposure apparatus required to have a positioning accuracy on the order of nm, even such a small positional error becomes problematic.

Figure 7:
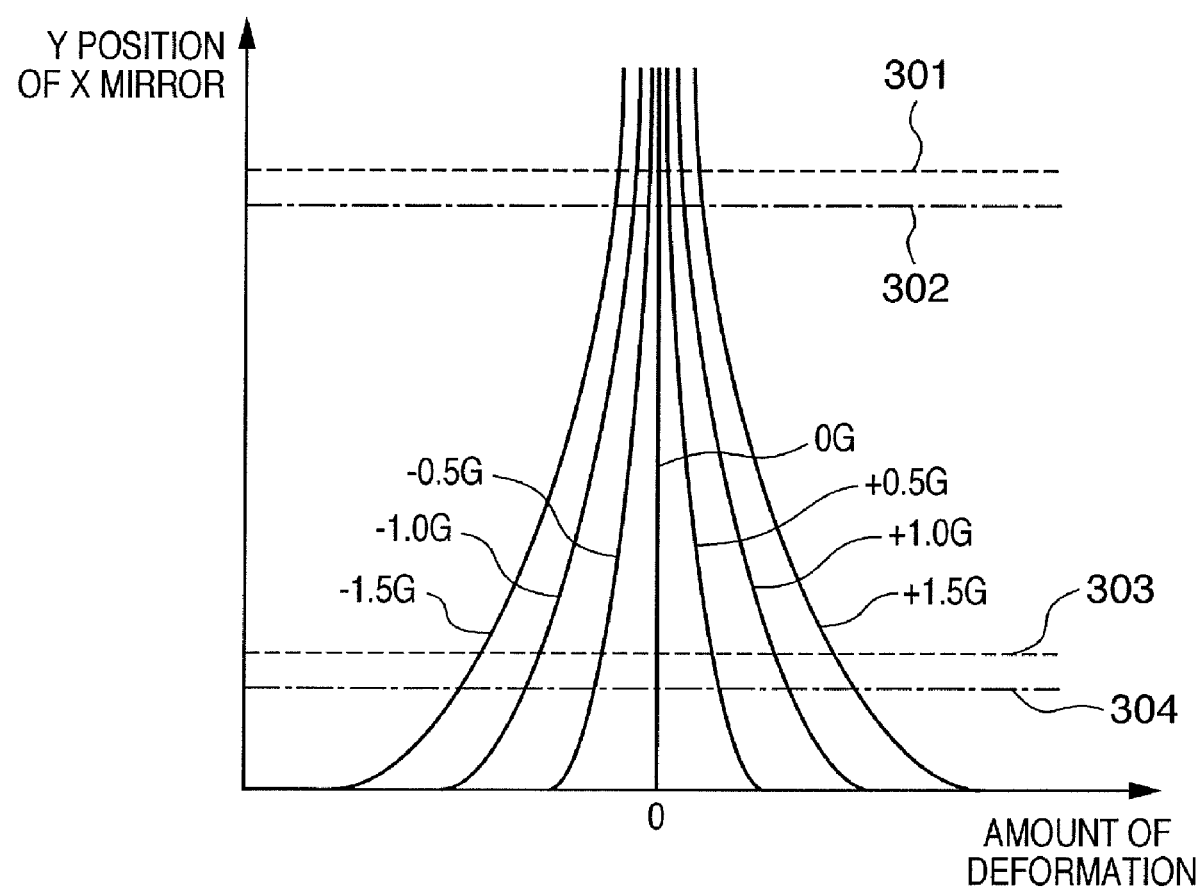
FIG. 7 is a graph showing the relationship between the position of an X mirror in the Y direction, and its amount of deformation upon changing the acceleration of the stage, at the time of interferometer switching.

FIG. 7 is a graph showing the relationship between the acceleration in the Y direction and the amount of deformation of the X mirror. The ordinate indicates the Y position of the X mirror, and the abscissa indicates the amount of deformation. The amount of deformation changes depending on a change in acceleration, because the magnitude of a force applied to the stage changes. The amount of deformation also changes depending on the acceleration direction. The amount of deformation also changes depending on the position of the mirror due to the influence of a mirror attachment method, the structure of the stage, and the shape of the stage top plate.

Figure 8:
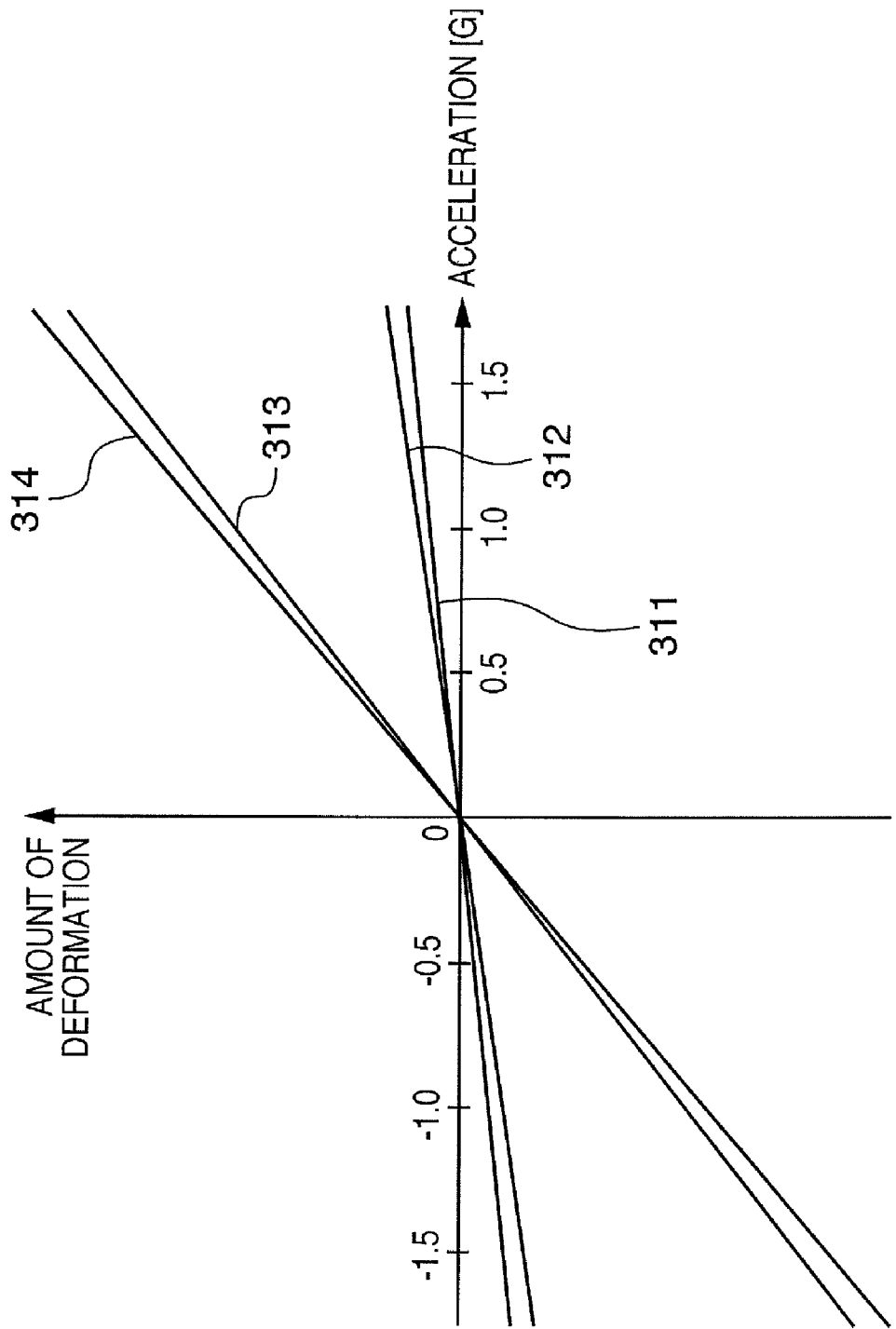
FIG. 8 is a graph showing the relationship between the acceleration of the stage and the amount of deformation of the mirror, for each position where the X-axis interferometer corresponds to the X mirror position.

FIG. 8 shows the relationship between the acceleration and the amount of deformation at the respective positions of the X mirror. The ordinate indicates the amount of deformation, and the abscissa indicates the acceleration. A line 311 shown in FIG. 8 at the stage position Y1, shown in FIG. 3, expresses the relationship between the acceleration and the amount of deformation at the Y position (a position 301 shown in FIG. 7) of the X mirror at which the measurement light beam axis of the X-axis interferometer 3 matches the X mirror. A line 312 shown in FIG. 8 at the stage position Y2, shown in FIG. 3, expresses the relationship between the acceleration and the amount of deformation at the Y position (a position 302 shown in FIG. 7) of the X mirror in which the measurement light beam axis of the X-axis interferometer 3 matches the X mirror. A line 313 shown in FIG. 8 at the stage position Y1, shown in FIG. 3, expresses the relationship between the acceleration and the amount of deformation at the Y position (a position 303 shown in FIG. 7) of the X mirror in which the measurement light beam axis of the X-axis interferometer 4 matches the X mirror. A line 314 shown in FIG. 8 at the stage position Y2, shown in FIG. 3, expresses the relationship between the acceleration and the amount of deformation at the Y position (a position 304 shown in FIG. 7) of the X mirror in which the measurement light beam axis of the X-axis interferometer 4 matches the X mirror. As shown in the graph of FIG. 8, the acceleration is normally nearly proportional to the amount of mirror deformation. The slope of this line changes depending on the mirror position. The difference in the amount of deformation between the X-axis interferometers 3 and 4 upon acceleration at the time of interferometer switching is a switching error. That is, the difference between the lines 311 and 313 is a switching error at the stage position Y1, while the difference between the lines 312 and 314 is a switching error at the stage position Y2. Correcting these errors in accordance with the acceleration at the time of interferometer switching allows for accurate interferometer switching.

Figure 9:
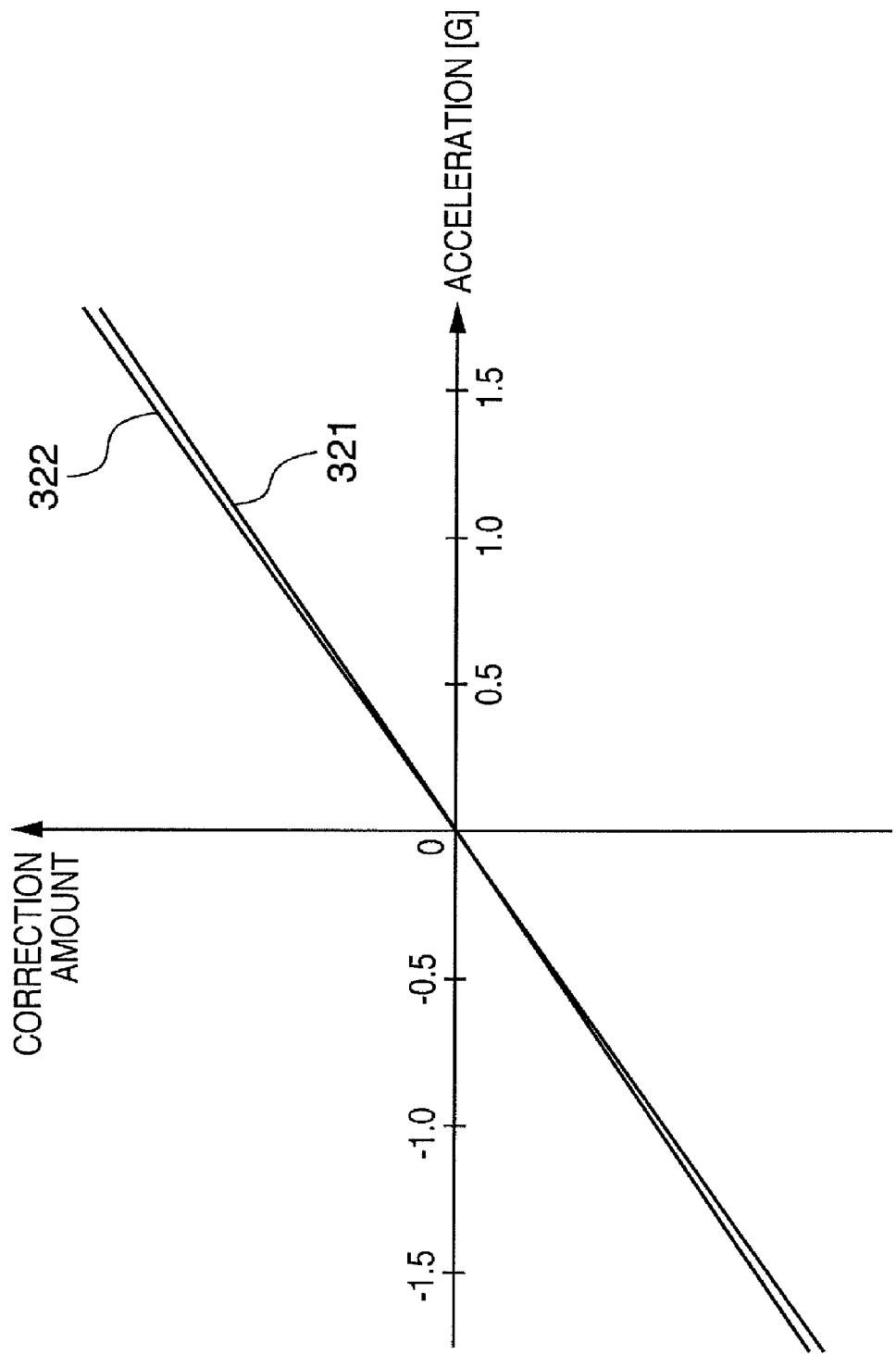
FIG. 9 is a graph showing the relationship between the acceleration of the stage and the amount of switching correction, for each Y position of the stage, when the interferometers are switched.

FIG. 9 is a graph showing the correction amount as a function of the acceleration. The abscissa indicates the acceleration, and the ordinate indicates the correction amount. Referring to FIG. 9, reference numeral 321 denotes a correction amount at the stage position Y1. The correction amount 321 is the difference between the lines 311 and 313 shown in FIG. 8. When the switching from the X-axis interferometer 3 to the X-axis interferometer 4 is performed at the position Y1, the correction amount of the line 321, corresponding to the acceleration at this time, is added to the value of the X-axis interferometer 3. Then, the resultant value is set as the initial value of the X-axis interferometer 4. A setting unit 17 of the control apparatus 14 sets the initial value of the X-axis interferometer 4 after switching, based on the stage position measured by the X-axis interferometer 3 before switching. A correction unit 15 of the control apparatus 14 calculates the correction amount of the line 321 corresponding to the acceleration, and corrects the measurement value of the X-axis interferometer 4. Similarly, when the switching from the X-axis interferometer 4 to the X-axis interferometer 3 is performed at the position Y2, the correction amount of a line 322, corresponding to the acceleration at this time, is subtracted from the value of the X-axis interferometer 4. Then, the resultant value is set as the initial value of the X-axis interferometer 3.

Since the acceleration is normally proportional to the correction amount, as shown in FIG. 9, calculation is simple, as long as the slope of the line illustrating this relationship is given. The relationship between the acceleration and the correction amount shown in FIG. 9 can be stored as a table. To store the correction amount as a table, it is necessary to interpolate the correction amount in accordance with the acceleration.

Even though the relationship between the acceleration and the correction amount shown in FIG. 9 can be calculated by the structural analysis of the wafer stage 7, it is difficult to exactly calculate such a small amount. Normally, therefore, it is desirable to measure a switching error in advance using another position measuring device that is able to measure it.

For example, the semiconductor exposure apparatus shown in FIG. 1 is provided with a laser displacement measurement device 80, which can accurately measure the absolute position of the X mirror on the wafer stage 7. The positions of the wafer stage 7 before and after switching are measured during the laser displacement measurement device 80, while changing the acceleration of the wafer stage 7 at the time of the switching from the X-axis interferometer 3 to the X-axis interferometer 4. The amount of change in stage position before and after this switching is calculated in advance as a positional error of the wafer stage 7. This makes it possible to calculate the relationship between the acceleration and the correction amount. The relationship between the acceleration and the correction amount thus calculated is stored as an approximation expression or table. Using this correction amount, correction is performed at the time of interferometer switching corresponding to the acceleration, as described above. The position measuring device for measuring a switching error is not limited to a laser displacement measurement device, as long as it can accurately measure absolute position. Moreover, the measuring device is not limited to one that measures the X mirror, and may be, for example, a scope that measures the position of a reference mark formed on the stage top plate.

The first embodiment has exemplified the relationship between the correction amount and the acceleration in the Y direction. However, similar correction and correction amount measurement is applicable to the acceleration in the X direction.

According to the first embodiment, it is possible to suppress switching errors, irrespective of conditions, such as the velocity and acceleration of the stage when the measuring devices are switched. Hence, an exposure apparatus using this positioning apparatus can improve the throughput and accuracy.

Second Embodiment

Figure 10:
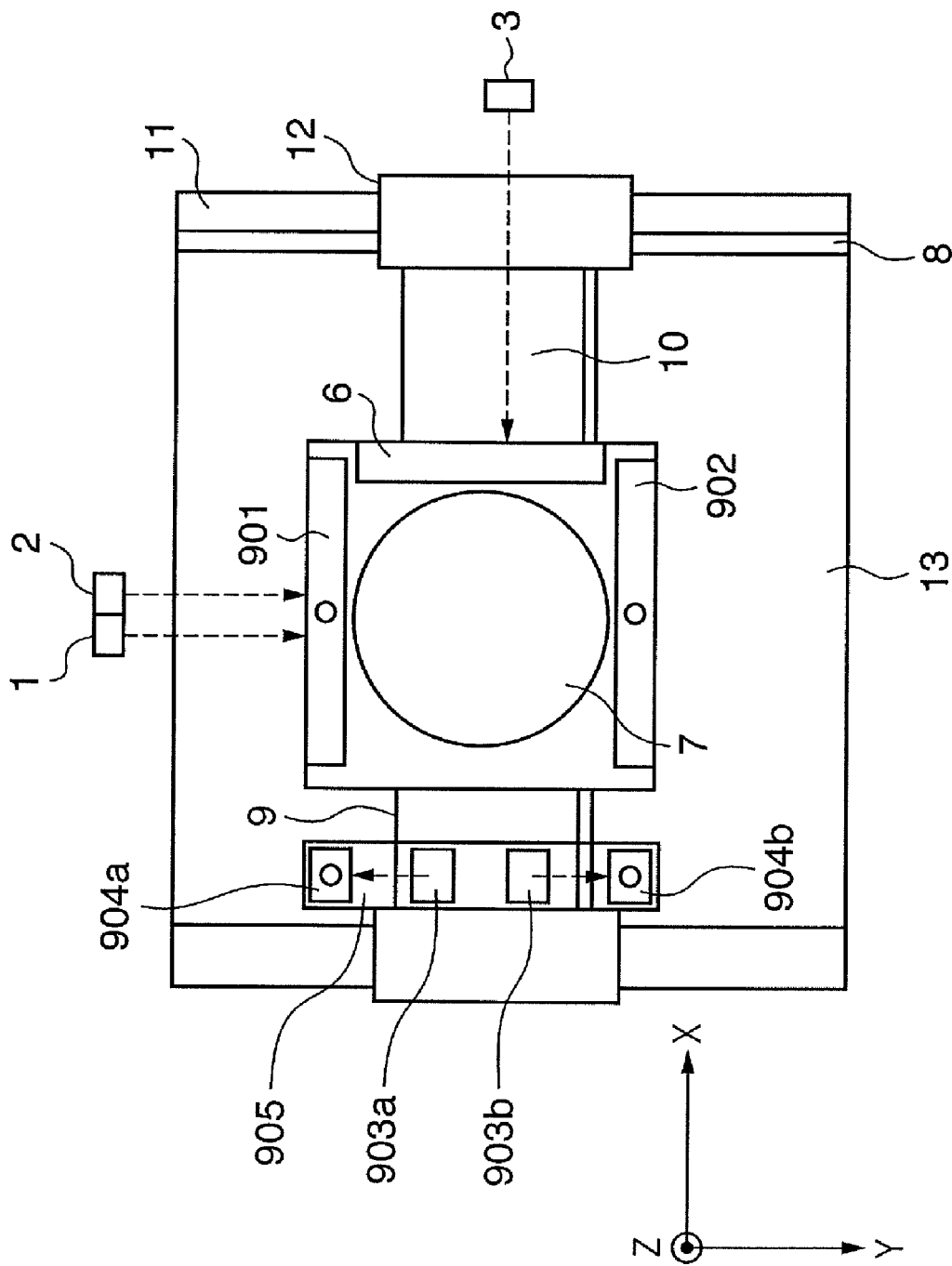
FIG. 10 is a view showing a positioning apparatus according to the second embodiment.

FIG. 10 is a view showing another positioning apparatus according to a preferred embodiment of the present invention, and, especially, exemplifies a case wherein this apparatus is applied to a wafer stage 7 of a semiconductor exposure apparatus. The same reference numerals as those in the first embodiment denote parts having the same functions in the second embodiment. The positioning apparatus shown in FIG. 10 is different from that shown in FIG. 1 in that a plurality of interferometer axes lie in the X-axis direction in FIG. 1, but they lie in the Z-axis direction in FIG. 10. The Y mirror 5, shown in FIG. 1, corresponds to a YZ1 mirror 901 in FIG. 10. The YZ1 mirror 901 also serves as a bar mirror for reflecting a measurement light beam from the first Z-axis laser interferometer in the Z-axis direction in FIG. 10. Furthermore, a Z2 mirror 902 is arranged on the opposite side of the YZ1 mirror 901 and reflects a measurement light beam from the second Z-axis laser interferometer. An optical fiber (not shown) guides the measurement light beams from the Z-axis laser interferometers to optical pickups 903a and 903b. The measurement light beams emerging from the optical pickups 903a and 903b are reflected by cube mirrors 904a and 904b in the Z-axis direction. A Z-axis optical system amount 905 is fixed on an XLM. As the Y-axis of the wafer stage 7 is driven, the Z-axis optical system amount 905 simultaneously moves in the Y direction.

Figure 11:
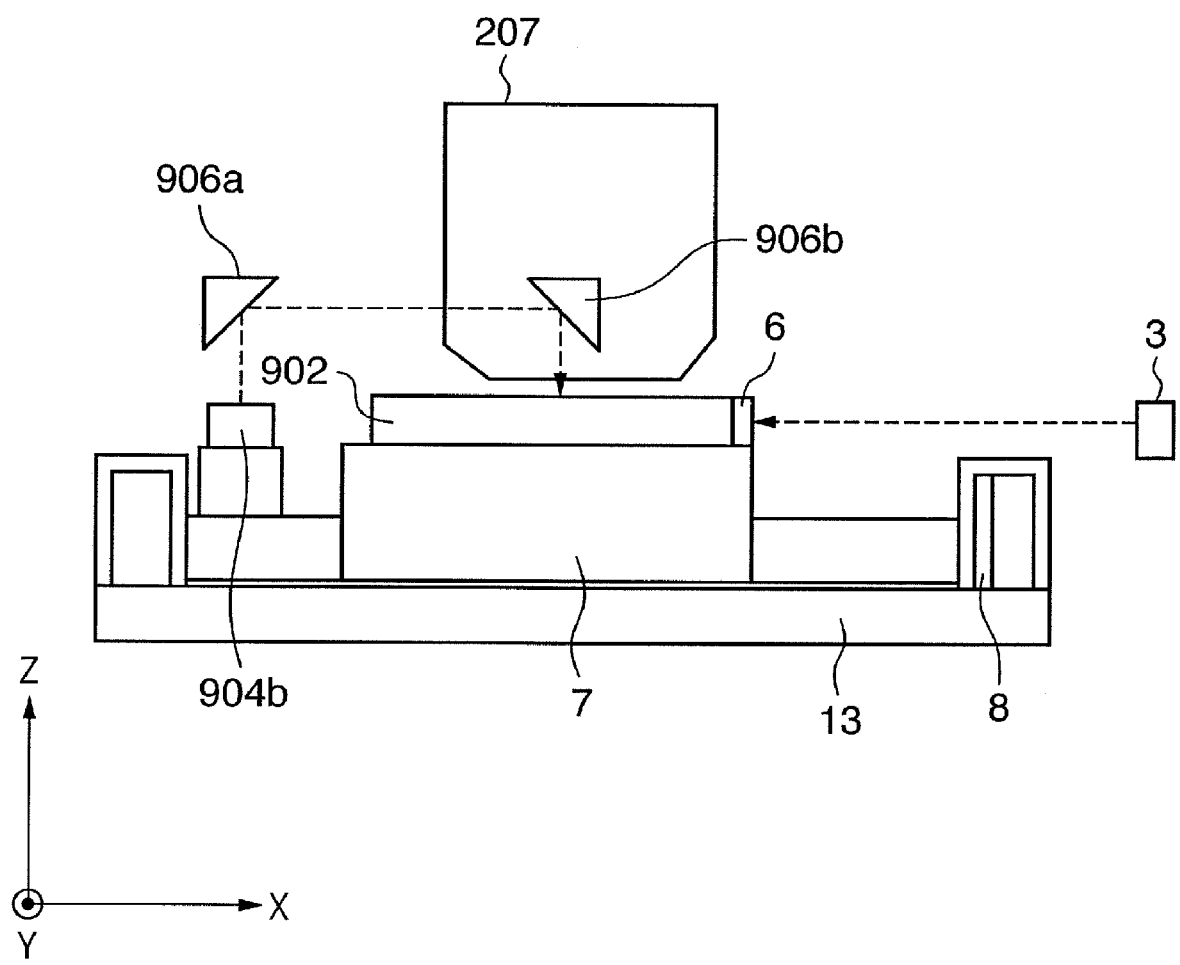
FIG. 11 is a side view of the positioning apparatus shown in FIG. 10.

FIG. 11 is a side view of the positioning apparatus shown in FIG. 10. The measurement light beams from the Z-axis interferometers reflected by the cube mirrors 904a and 904b in the Z-axis direction are perpendicularly bent by triangular mirrors 906a and 906b, and reach the YZ1 mirror 901 and Z2 mirror 902. The triangular mirrors 906a and 906b are fixed with respect to a projection lens 207. As the wafer stage 7 is driven in the Y direction, the spot positions of the triangular mirrors 906a and 906b, where the measurement light beams strike, move in the Y-axis direction. Another triangular mirror 906b is symmetrically arranged on the back side of the sheet surface of the projection lens 207 and bends the measurement light beam from the YZ1 mirror measurement interferometer. In the second embodiment, the projection lens 207 must be arranged around the center of a stage driving stroke. As the laser interferometer executes measurement in the Z-axis direction, the projection lens 207 shields the measurement light beam axis of this interferometer. For this reason, interferometer switching is necessary in the driving stroke of the wafer stage 7.

Figure 12:
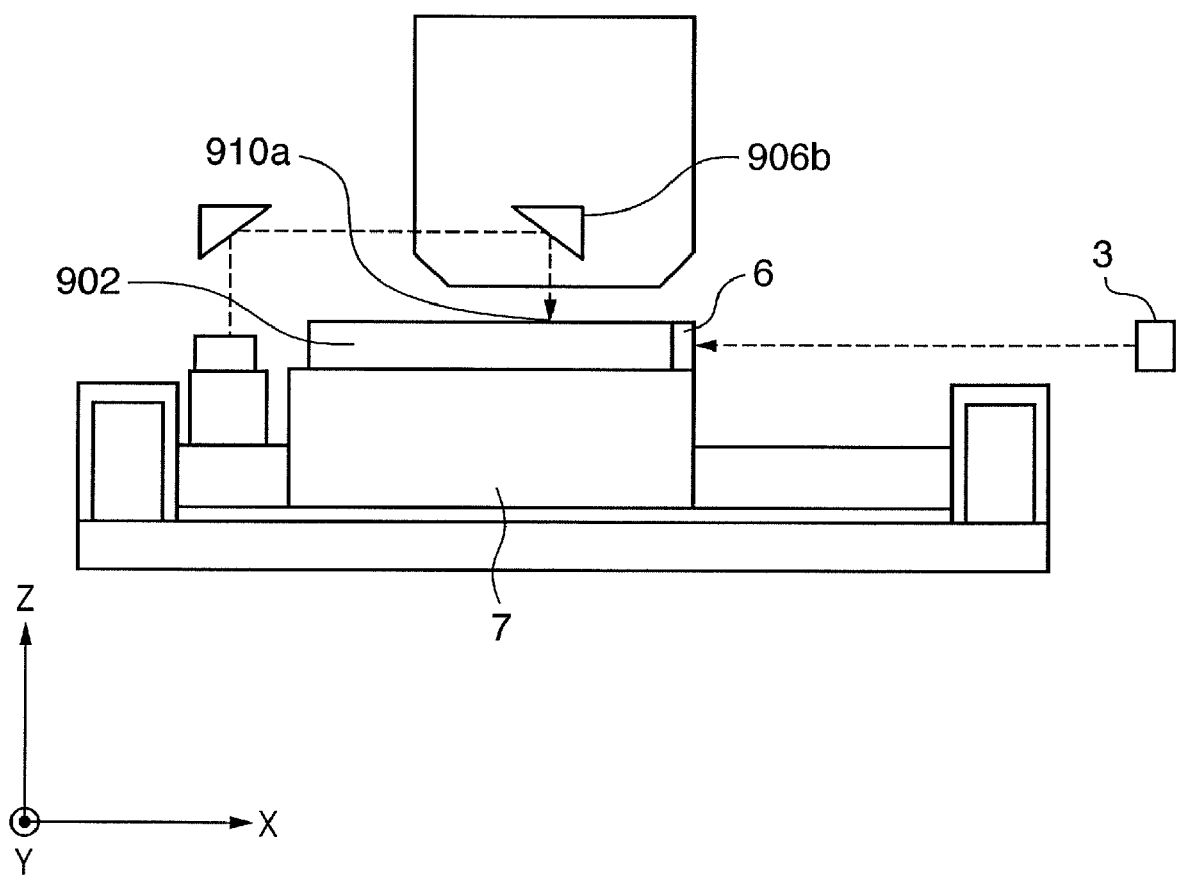
FIG. 12 is a view showing a stage wherein a wafer stage is present at the leftmost position in the positioning apparatus shown in FIG. 11.
Figure 13:
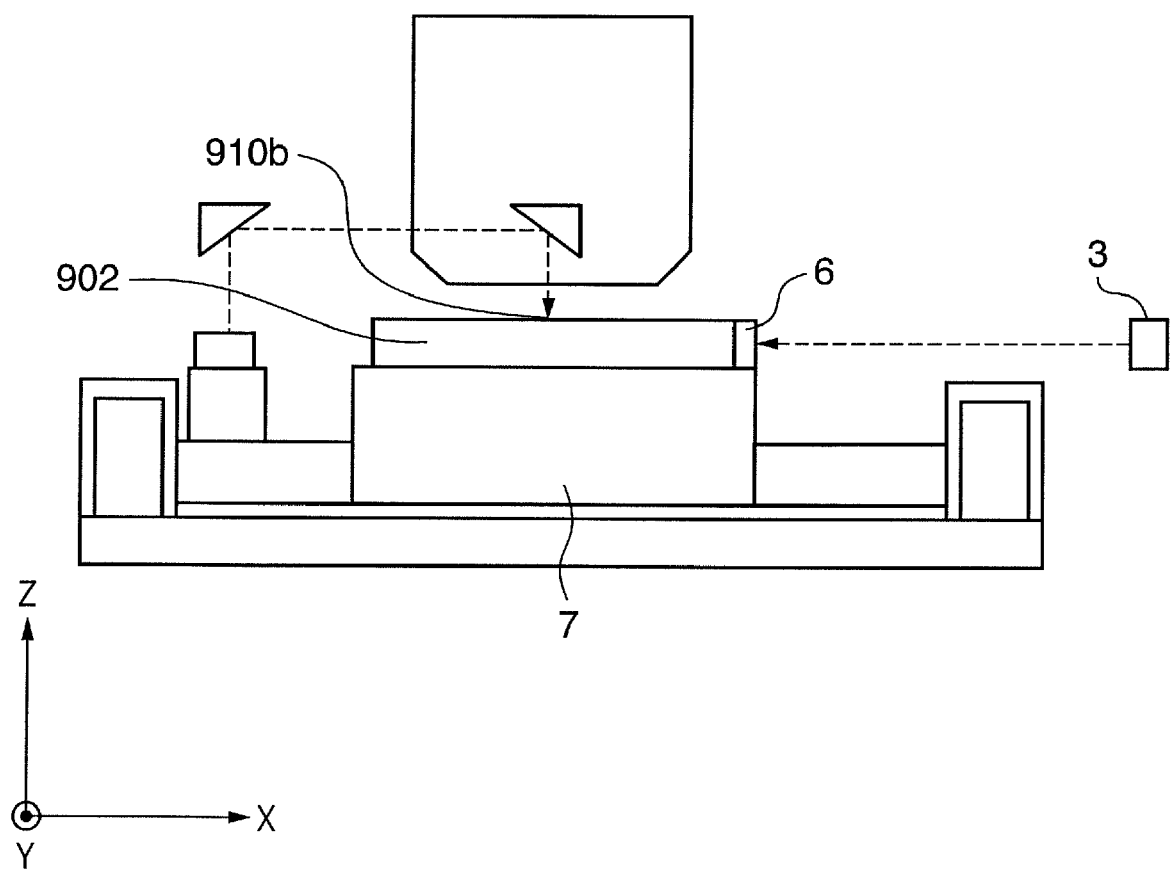
FIG. 13 is a view showing a state wherein the wafer stage is present at the central position in the positioning apparatus shown in FIG. 11.
Figure 14:
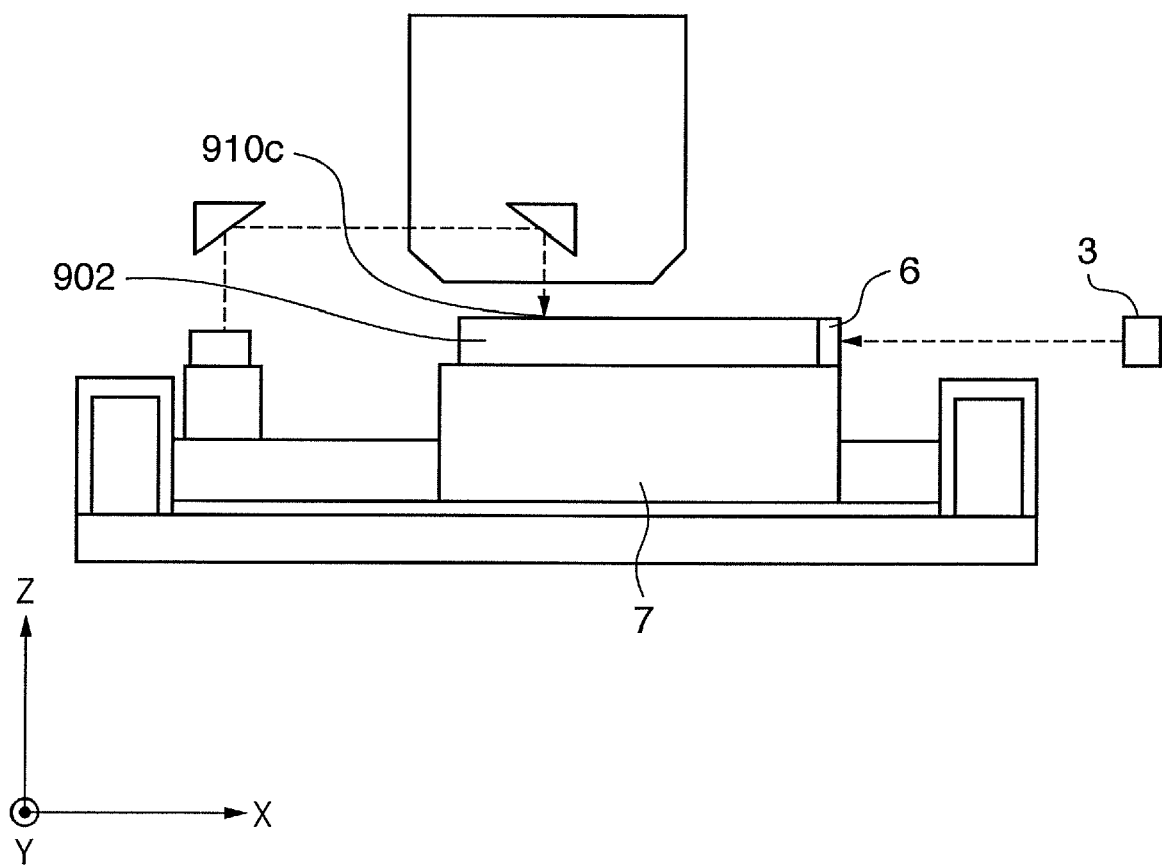
FIG. 14 is a view showing a state wherein the wafer stage is present at the rightmost position in the positioning apparatus shown in FIG. 11.

The second embodiment is different from the first embodiment in that the positions of the YZ1 mirror and Z2 mirror where measurement light beams strike arbitrarily change. The YZ1 mirror and Z2 mirror are switched in accordance with the X position of the wafer stage 7. This mechanism will be explained with reference to FIGS. 12 to 14. FIG. 12 shows a state wherein the wafer stage 7 is present at the leftmost position along the X-axis. A Z measurement point 910a indicates the position of the Z2 mirror 902 where a measurement light beam from the Z interferometer strikes. When the wafer stage 7 moves to the center in the X direction, as shown in FIG. 13, the position of the Z2 mirror 902, where the measurement light beam from the Z interferometer strikes, moves to a Z measurement point 910b. When the wafer stage 7 further moves to the rightmost position in the X direction, as shown in FIG. 14, the position of the Z2 mirror 902, where the measurement light beam from the Z interferometer strikes, further moves to a Z measurement point 910c. Although not shown, the position of the YZ1 mirror, where the measurement light beam from the Z interferometer strikes, changes depending on the X position of the wafer stage 7, as well.

As shown in FIG. 7, the relationship between the acceleration and the amount of mirror deformation greatly changes depending on the mirror position. The same applies to the YZ1 mirror and Z2 mirror. For this reason, the relationship between the acceleration and the switching error at the time of Z interferometer switching changes depends on a change in the X position of the wafer stage 7. As described in the first embodiment, the acceleration is nearly proportional to the amount of mirror deformation, as shown in FIG. 8. However, the proportional coefficient of this relationship changes depending on the mirror position.

Even in this case, when the correction unit 15 corrects the initial value for Z interferometer switching in accordance with the acceleration and X position of the wafer stage 7, it is possible to minimize switching errors, even during the acceleration of the wafer stage 7. Also, in the second embodiment, the relationships among the switching correction amount and the acceleration and X position of the stage are stored as tables or approximation functions. Another position measurement means desirably measures the relationships between the switching correction amount and the acceleration and X position of the stage, in advance, by changing the acceleration and X position of the stage. In the second embodiment, this position measurement means may be a focus sensor normally built in the semiconductor exposure apparatus. The focus sensor can measure the Z position of a wafer or reference plate on the wafer stage. As a matter of course, the focus sensor can be a position sensor of another type, such as a static capacitance sensor or a laser displacement measurement device, as long as it can measure the Z position.

Figure 15:
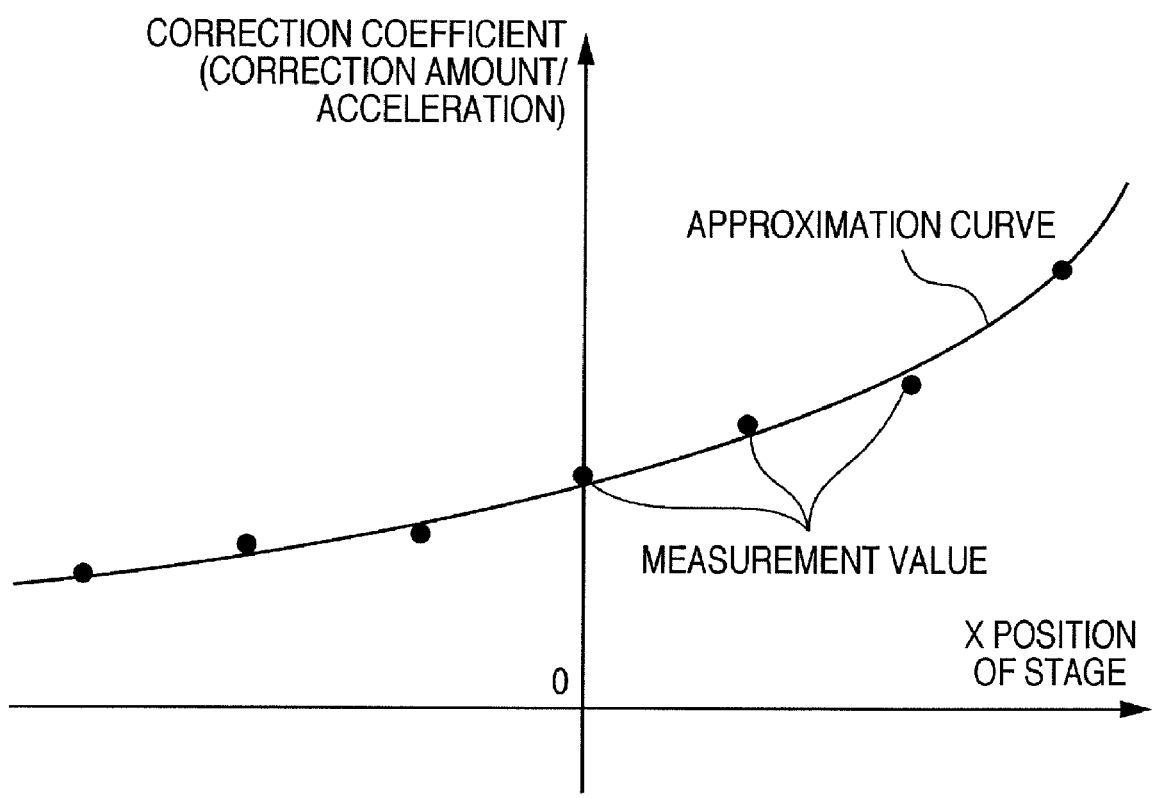
FIG. 15 is a graph showing the relationship between the correction coefficient and the X position of the stage.

FIG. 15 shows the correction coefficient of the switching correction amount for the stage acceleration as a function of the X position of the stage. The abscissa indicates the X position of the stage, and the ordinate indicates the correction coefficient. The correction coefficient is the proportional coefficient of the correction amount with respect to the acceleration, that is, (switching correction amount)/(acceleration). The relationship shown in FIG. 15 can be calculated by changing the X position and acceleration of the stage to switch between the Z interferometers, and by causing another Z position measurement means to measure an error at this time. Referring to FIG. 15, points indicate measurement values and a line indicates the approximation curve of an approximation function calculated from the measurement values. According to the present invention, the correction coefficient is calculated first using the approximation function from the X position of the wafer stage at the time of Z interferometer switching. On the basis of the calculated correction coefficient, a correction amount corresponding to the acceleration at the time of interferometer switching is calculated. When the position after Z interferometer switching is corrected using the calculated correction amount, it is possible to suppress interferometer switching errors due to mirror deformation, even during stage acceleration.

[Embodiment of an Exposure Apparatus]

An exemplary exposure apparatus, to which a positioning apparatus according to the present invention is applied, will be explained below. As shown in FIG. 16, the exposure apparatus comprises an illumination device 101, a reticle stage 102, which supports a reticle, a projection optical system 103, and a wafer stage 104, which supports a wafer. The exposure apparatus projects the circuit pattern formed on the reticle onto the wafer by exposure, and may be of a step and repeat projection exposure scheme or a step and scan projection exposure scheme.

The illumination device 101 illuminates the reticle on which the circuit pattern is formed, and comprises a light source unit and an illumination optical system. The light source unit uses, for example, a laser as a light source. The laser can use, for example, an ArF excimer laser with a wavelength of about 193 nm, a KrF excimer laser with a wavelength of about 248 nm, or an $F_2$ excimer laser with a wavelength of about 153 nm. The type of laser is not limited to an excimer laser and may use, for example, a YAG laser. The number of lasers is not limited, either. If the light source uses a laser, the illumination device 101 preferably uses a light beam shaping optical system for shaping a parallel light beam from the laser light source into a desired beam shape, and an incoherent optical system for converting a coherent laser light beam into an incoherent light beam. The light source usable for the light source unit is not limited to a laser, and one or a plurality of lamps, such as mercury lamps or xenon lamps, can be used.

The illumination optical system illuminates a mask and includes, for example, a lens, a mirror, a light integrator, and a stop.

The projection optical system 103 can use, for example, an optical system including only a plurality of lens elements, an optical system including a plurality of lens elements and at least one concave mirror, an optical system including a plurality of lens elements and at least one diffraction optical element, or an optical system in which all of the optical elements are mirrors.

Linear motors, for example, can move the reticle stage 102 and wafer stage 104. The positioning apparatuses according to the first and second embodiments can position at least one of the reticle stage 102 and wafer stage 104. If the exposure apparatus is of a step and scan projection exposure scheme, these stages move in synchronism with each other. An actuator is separately provided on at least one of the wafer stage and reticle stage to position the pattern of the reticle on the wafer.

This exposure apparatus can be used to manufacture a device on which a micropattern is formed, for example, a semiconductor device, such as a semiconductor integrated circuit, a micromachine, or a thin film magnetic head.

[Embodiment of Device Manufacture]

Figure 17:
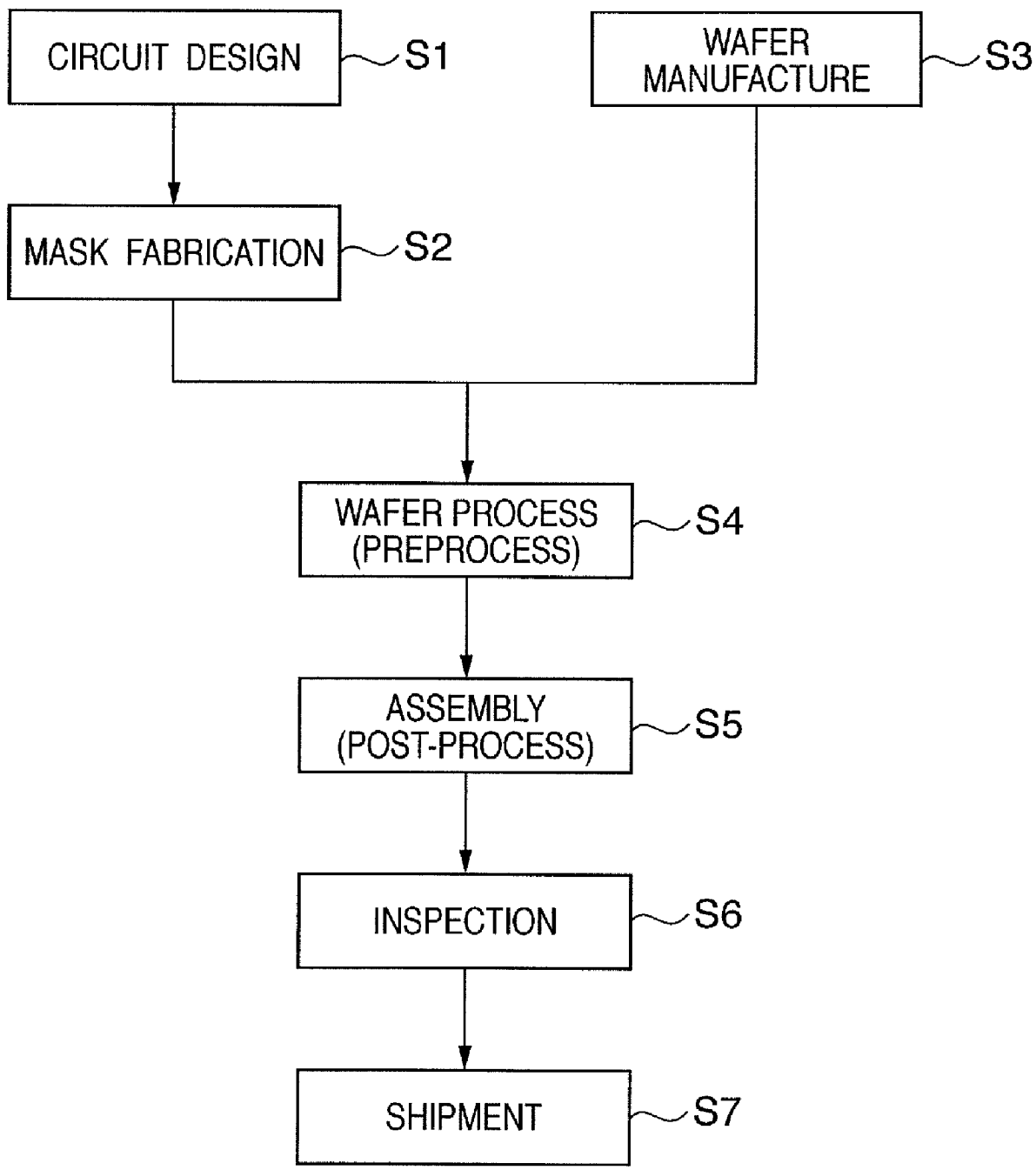
FIG. 17 is a flowchart for explaining device manufacture using the exposure apparatus.

An embodiment of a device manufacturing method using the above-described exposure apparatus will be explained next, with reference to FIGS. 17 and 18. FIG. 17 is a flowchart for explaining the manufacture of a device (for example, a semiconductor chip, such as an IC or an LSI, an LCD, or a CCD). A semiconductor chip manufacturing method will be exemplified here.

In step S1 (circuit design), the circuit of a semiconductor device is designed. In step S2 (mask fabrication), a mask is fabricated on the basis of the designed circuit pattern. In step S3 (wafer manufacture), a wafer is manufactured using a material such as silicon. In step S4 (wafer process), called a preprocess, the above-described exposure apparatus forms an actual circuit on the wafer by lithography using the mask and wafer. In step S5 (assembly), called a post-process, a semiconductor chip is formed using the wafer manufactured in step S4. This step includes an assembly step (dicing and bonding) and a packaging step (chip encapsulation). In step S6 (inspection), the semiconductor device manufactured in step S5 undergoes inspections, such as an operation confirmation test and a durability test. After these steps, the semiconductor device is completed and shipped, in step S7.

Figure 18:
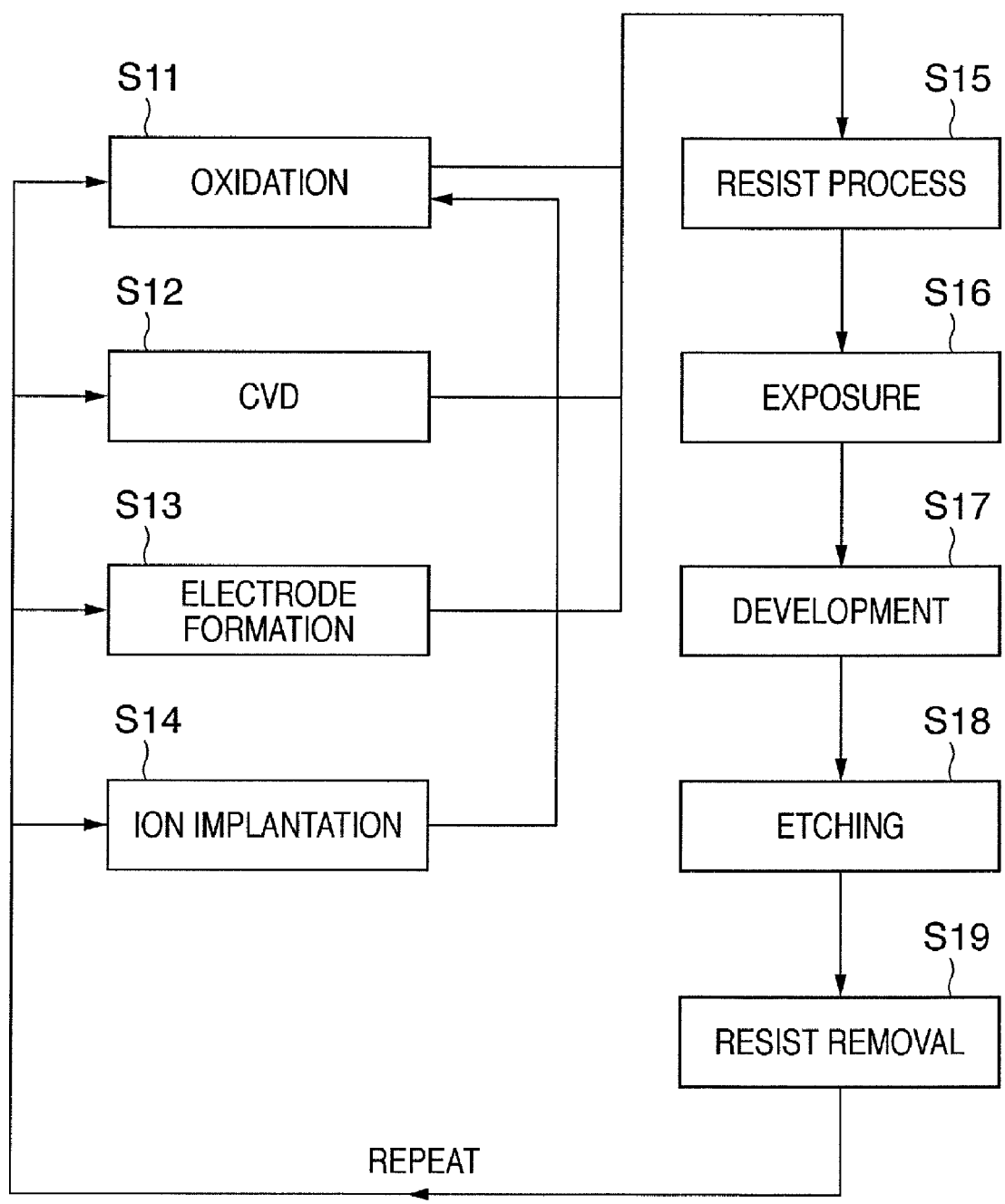
FIG. 18 is a flowchart illustrating details of the wafer process in step 4 shown in the flowchart of FIG. 17.

FIG. 18 is a flowchart illustrating details of the wafer process shown in step S4 of FIG. 17. In step S11 (oxidation), the wafer surface is oxidized. In step S12 (CVD), a dielectric film is formed on the wafer surface. In step S13 (electrode formation), an electrode is formed on the wafer by deposition. In step S14 (ion implantation), ions are implanted into the wafer. In step S15 (resist process), a photosensitive agent is applied on the wafer. In step S16 (exposure), the exposure apparatus transfers the circuit pattern of the mask onto the wafer by exposure. In step S17 (development), the exposed wafer is developed. In step S18 (etching), portions other than the developed resist image are etched. In step S19 (resist removal), any unnecessary resist remaining after etching is removed. By repeating these steps, a mulitlayered structure of circuit patterns is formed on the wafer.

While the present invention has been described with reference to exemplary embodiments, it is to be understood that the invention is not limited to the disclosed exemplary embodiments. The scope of the following claims is to be accorded the broadest interpretation, so as to encompass all such modifications and equivalent structures and functions.

What is claimed is:

1. A positioning apparatus which positions a stage, the apparatus comprising:
   a measurement system which measures a position of the stage, said measurement system including a plurality of measuring devices which are spaced apart from each other along a first direction and measure a position of the stage in a second direction;
   a switching unit which switches between said measuring devices to measure the position of the stage when the stage moves in at least the first direction; and
   a correction unit which corrects, based on an acceleration of the stage, a value measured by said measurement system,
   wherein when said switching unit switches between said plurality of measuring devices, said correction unit corrects, based on a correction value corresponding to an acceleration, a value measured by a measuring device after the switching.

2. The apparatus according to claim 1, wherein
   said plurality of measuring devices comprise interferometers, and
   the stage comprises a mirror which reflects measurement light beams from said plurality of interferometers.

3. The apparatus according to claim 1, wherein said correction unit performs the correction based on a position of the stage in the first direction, in addition to the acceleration of the stage.

4. The apparatus according to claim 1, wherein the stage can move in an X direction and a Y direction, orthogonal to each other, on a surface of the stage, and in a Z direction, perpendicular to both the X direction and the Y direction, and the second direction is a Z direction.

5. The apparatus according to claim 1, further comprising:
   a setting unit which, when said switching unit switches between said measuring devices, sets an initial value of another measuring device, after switching, based on a position of the stage measured by one measuring device before switching,
   wherein said correction unit corrects the initial value based on information containing the acceleration of the stage.

6. The apparatus according to claim 1, further comprising:
   a displacement measurement device which can measure the position of the stage in the second direction,
   wherein information about correction based on the acceleration of the stage is based on an amount of change in the position of the stage before and after said switching unit switches between said measuring devices, which are measured in advance for every acceleration of the stage by said displacement measurement device.

7. An exposure apparatus in which at least one of a reticle stage and a wafer stage is positioned using a positioning apparatus which positions a stage, the positioning apparatus comprising:
   a measurement system which measures a position of the stage, said measurement system including a plurality of measuring devices which are spaced apart from each other along a first direction and measure a position of the stage in a second direction;
   a switching unit which switches between said measuring devices to measure the position of the stage when the stage moves in at least the first direction; and
   a correction unit which corrects, based on an acceleration of the stage, a value measured by said measurement system,
   wherein when said switching unit switches between said plurality of measuring devices, said correction unit corrects, based on a correction value corresponding to an acceleration, a value measured by a measuring device after the switching.

8. A method of manufacturing a device, said method comprising the steps of:
   exposing a wafer using an exposure apparatus defined in claim 7; and
   developing the exposed wafer to manufacture a device.

9. A positioning apparatus which positions a stage, the apparatus comprising:
   a measurement system which measures a position of the stage, said measurement system including a plurality of measuring devices which are spaced apart from each other along a first direction and measure a position of the stage in a second direction;
   a switching unit which switches between said measuring devices to measure the position of the stage when the stage moves in at least the first direction;
   setting unit which, when said switching unit switches between said measuring devices, sets and initial value of said measuring device after switching based on a position of the stage measured by a measuring device before switching; and
   a correction unit which corrects the initial value based on information containing the acceleration of the stage.

10. A positioning apparatus which positions a stage, the apparatus comprising:
    a measurement system which measures a position of the stage, said measurement system including a plurality of measuring devices which are spaced apart from each other along a first direction and measure a position of the stage in a second direction; and
    a control apparatus which switches between said measuring devices to measure the position of the stage when the stage moves in at least the first direction,
    wherein, based on a correction amount corresponding to the acceleration of the stage when switching and a measurement value of one measuring device before switching, said control apparatus sets a measurement value of the other measuring device after switching.

* * * * *